(12) United States Patent
Merget et al.

(10) Patent No.: US 8,735,508 B2
(45) Date of Patent: May 27, 2014

(54) MIXTURES COMPRISING AMINOALKYL-CONTAINING POLYORGANOSILOXANES AND SILICONE RESINS

(75) Inventors: Markus Merget, Mehring (DE); Richard Becker, Burghausen (DE); Franz Wimmer, Burghausen (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/821,325

(22) PCT Filed: Sep. 12, 2011

(86) PCT No.: PCT/EP2011/065763
§ 371 (c)(1),
(2), (4) Date: Mar. 7, 2013

(87) PCT Pub. No.: WO2012/038292
PCT Pub. Date: Mar. 29, 2012

(65) Prior Publication Data
US 2013/0165566 A1    Jun. 27, 2013

(30) Foreign Application Priority Data
Sep. 20, 2010 (EP) .................................... 10177521

(51) Int. Cl.
*C08G 77/26* (2006.01)

(52) U.S. Cl.
USPC ........................................................ 525/477

(58) Field of Classification Search
USPC ........................................................ 525/477
See application file for complete search history.

(56) References Cited

U.S. PATENT DOCUMENTS

| | | | |
|---|---|---|---|
| 3,890,269 A * | 6/1975 | Martin | 528/14 |
| 2006/0041026 A1 | 2/2006 | Mahr et al. | |
| 2007/0128962 A1 | 6/2007 | Serobian | |
| 2007/0238838 A1 * | 10/2007 | Schultz et al. | 525/477 |

FOREIGN PATENT DOCUMENTS

| | | |
|---|---|---|
| DE | 102006032456 A1 | 2/2007 |
| EP | 0 628 615 A1 | 12/1994 |
| WO | 2006/097207 A1 | 9/2006 |
| WO | 2006/097207 A2 | 9/2006 |
| WO | 2006/097207 A3 | 9/2006 |

* cited by examiner

*Primary Examiner* — Kuo-Liang Peng
(74) *Attorney, Agent, or Firm* — Brooks Kushman P.C.

(57) ABSTRACT

Storage stable polyorganosiloxane-silicone resin mixtures contain:
1) 100 parts by weight of one or more liquid aminoalkyl-containing polyorganosiloxanes containing at least 80 mol % of units selected from units of the formulae Ia, Ib, II and III $$R^1{}_2SiO_{(4-a-b)/2} \quad (Ia),$$
$$R^1{}_aR^2{}_bSiO_{(4-a-b)/2} \quad (Ib),$$
$$R^3{}_3SiO_{(1/2)} \quad (II),$$
$$R^3{}_2R^4SiO_{(1/2)} \quad (III),$$

wherein, in the polydimethylsiloxanes, the average ratio of the sum of units of the formulae Ia and Ib to the sum of units of the formulae II and III is in the range from 0.5 to 500, the average ratio of units II to III in the range of 1.86 to 100, and the polydimethylsiloxanes have an average amine number of ≥0.01 mequiv/g,
2) at least 1 part by weight of one or more silicone resins, and
3) at most 5 parts by weight of water.

19 Claims, No Drawings

MIXTURES COMPRISING AMINOALKYL-CONTAINING POLYORGANOSILOXANES AND SILICONE RESINS

CROSS-REFERENCE TO RELATED APPLICATIONS

This application is the U.S. national phase of PCT Appln. No. PCT/EP2011/065763 filed Sep. 12, 2011 which claims priority to European application 10177521.1 filed Sep. 20, 2010, the disclosures of which are incorporated in their entirety by reference herein.

BACKGROUND OF THE INVENTION

1. Field of the Invention

The invention relates to water-free mixtures comprising aminoalkyl-containing polyorganosiloxanes and silicone resins.

2. Description of the Related Art

Aqueous compositions comprising amino-functional organopolysiloxanes are known. Such compositions are used for example for hydrophobicizing treatment of natural and/or synthetic textile fibres, for hydrophobicizing treatment of building products, as a constituent of care agents and as a constituent of cosmetic preparations. Patents cited hereinbelow all have in common that they concern aqueous mixtures of MQ resins and silicone oils. US 20060041026 and DE102006032456 describe the treatment of textile fibres with oil-in-water emulsions of aminoalkyl-containing polydimethylsiloxanes in the presence of silicone resins of low emulsifier content. WO2006097207 and WO2006097227 likewise describe an aqueous emulsion consisting of polydimethylsiloxanes and silicone resins for treatment of fibres and for reducing wrinkling. US2007128962 utilizes an aqueous mixture of polydimethylsiloxane, MQ resin and a volatile silicone solvent for imparting resistance to stain absorption. A water-free mixture composed of polydimethylsiloxane and silicone resin and useful as a coating material is described in EP 628615. However, the mixture in question first has to be melted to obtain flowable materials. The absence of functionality on the polydimethylsiloxane must be assumed to lead to poor adhesion to different substrates.

US 20060041026 describes a water-free mixture of aminoalkyl-containing silicone oils and silicone resins. However, these mixtures have the disadvantage that the excessively low proportion of reactive end groups leads to poor crosslinking.

SUMMARY OF THE INVENTION

The present invention provides polyorganosiloxane-silicone resin mixtures (M) comprising 1) 100 parts by weight of one or more liquid aminoalkyl-containing polyorganosiloxanes (P) comprising at least 80 mol % of units selected from units of the general formulae Ia, Ib, II and III $$R^1{}_2SiO_{(4-a-b)/2} \quad \text{(Ia)},$$

$$R^1{}_aR^2{}_bSiO_{(4-a-b)/2} \quad \text{(Ib)},$$

$$R^3{}_3SiO_{(1/2)} \quad \text{(II)},$$

$$R^3{}_2R^4SiO_{(1/2)} \quad \text{(III)},$$

where
a has the value 0 or 1,
b has the value 1 or 2,
a+b has a value of 2,
$R^1$ represents monovalent hydrocarbyl radicals having 1-40 carbon atoms and optionally substituted with halogens,
$R^2$ represents either
a) aminoalkyl radicals of the general formula IV $$-R^5-NR^6R^7 \quad \text{(IV)}$$

where
$R^5$ represents divalent hydrocarbyl radicals having 1-40 carbon atoms,
$R^6$ represents monovalent hydrocarbyl radicals having 1-40 carbon atoms, H, hydroxymethyl or alkanoyl radicals, and
$R^7$ represents a radical of the general formula V $$-(R^8-NR^6)_xR^6 \quad \text{(V)}$$

where
x has the value 0 or an integer value from 1 to 40, and
$R^8$ represents a divalent radical of the general formula VI $$-(CR^9{}_2-)_y \quad \text{(VI)}$$

where
y has an integer value from 1 to 6, and
$R^9$ represents H or hydrocarbyl radicals having 1-40 carbon atoms, or
b) in the general formula IV $R^6$ and $R^7$ combine with the nitrogen atom to form a cyclic organic radical having 3 to 8 —$CH_2$— units, although nonadjacent —$CH_2$— units may be replaced by units selected from —C(=O)—, —NH—, —O— and —S—,
$R^3$ represents hydrocarbyl radicals having 1-40 carbon atoms and optionally substituted with halogens,
$R^4$ represents —OR or —OH radicals, and wherein, in the polyorganosiloxanes (P),
the average ratio of the sum of units of the general formulae Ia and Ib to the sum of units of the general formulae II and III is in the range from 0.5 to 500,
the average ratio of units II to III being in the range from 1.86 to 100, and the polyorganosiloxanes (P) have an average amine number of at least 0.01 mequiv/g,
2) at least 1 part by weight of one or more silicone resins (S) which each comprise at least 80 mol % of units selected from units of the general formulae VII, VIII, IX and X $$R^{10}{}_3SiO_{1/2} \quad \text{(VII)},$$

$$R^{10}{}_2SiO_{2/2} \quad \text{(VIII)},$$

$$R^{10}SiO_{3/2} \quad \text{(IX)},$$

$$SiO_{4/2} \quad \text{(X)},$$

where
$R^{10}$ represents hydrocarbyl radicals having 1-40 carbon atoms and optionally substituted with halogens, or H, —OR or —OH radicals,
at least 20 mol % of the units are selected from units of the general formulae IX and X
and at most 10% by weight of the $R^{10}$ radicals are —OR and —OH radicals, and
3) at most 5 parts by weight of water.

DETAILED DESCRIPTION OF THE PREFERRED EMBODIMENTS

Using aminoalkyl-containing polyorganosiloxanes (P) having a certain ratio between nonreactive end groups of the general formula II and reactive end groups of the general formula III ensures that these mixtures (M) are storable for at least 3 months in the absence of atmospheric humidity, yet still have a sufficient number of reactive end groups to provide adequate crosslinking to form an elastic film in the presence of atmospheric humidity. These elastic films have a strong hydrophobicizing effect on surfaces. The absence or limited presence of water makes it possible to use this mixture in sectors in which water is not desired, for example washing powders.

The monohydric hydrocarbyl radicals R, $R^1$, $R^3$, $R^6$, $R^9$ and $R^{10}$ may be halogen substituted, linear, cyclic, branched, aromatic, saturated or unsaturated. Preferably, the monovalent hydrocarbyl radicals R, $R^1$, $R^3$, $R^6$, $R^9$ and $R^{10}$ each have 1 to 6 carbon atoms, and particular preference is given to alkyl radicals and phenyl radicals. Preferred halogen substituents are fluorine and chlorine. Particularly preferred monovalent hydrocarbyl radicals R, $R^1$, $R^3$, $R^6$, $R^9$ and $R^{10}$ are methyl, ethyl, and phenyl.

The divalent hydrocarbyl radicals $R^5$ may be halogen substituted, linear, cyclic, branched, aromatic, saturated or unsaturated. Preferably, the $R^5$ radicals have 1 to 10 carbon atoms, and particular preference is given to alkylene radicals having 1 to 6 carbon atoms, in particular propylene. Preferred halogen substituents are fluorine and chlorine.

Preferred $R^6$ radicals are alkyl and alkanoyl radicals. Preferred halogen substituents are fluorine and chlorine. Preferred alkanoyl radicals are —C(=O)$R^{11}$, where $R^{11}$ has the meanings and preferred meanings of $R^1$. Particularly preferred substituents $R^6$ are methyl, ethyl, cyclohexyl, acetyl and H. It is particularly preferable for the $R^6$ and $R^7$ radicals to be hydrogen.

Preferred cyclic organic radicals formed from $R^6$ and $R^7$ in the general formula IV together with the attached nitrogen atom are the five and six membered rings, in particular the residues of pyrrolidine, pyrrolidin-2-one, pyrrolidine-2,4-dione, pyrrolidin-3-one, pyrazol-3-one, oxazolidine, oxazolidin-2-one, thiazolidine, thiazolidin-2-one, piperidine, piperazine, piperazine-2,5-dione and morpholine.

Particularly preferred $R^2$ radicals are —$CH_2NR^6R^7$, —$(CH_2)_3NR^6R^7$ and —$(CH_2)_3N(R^6)$ $(CH_2)_2N(R^6)_2$. Examples of particularly preferred $R^2$ radicals are aminoethylaminopropyl and cyclohexylaminopropyl.

Preference is also given to mixtures (M) wherein at least 1 mol %, more preferably at least 5 mol %, and most preferably at least 20 mol % and at most 90 mol %, more preferably at most 70 mol % and most preferably at most 60 mol % of the $R^6$ and $R^7$ radicals are acetyl radicals and the remaining $R^6$ and $R^7$ radicals have the meaning H.

Preferably, b is 1. Preferably, a+b has an average value from 1.9 to 2.2.

Preferably, x is 0 or a value from 1 to 18, more preferably 1 to 6.

Preferably, y is 1, 2 or 3.

Preferably, the polydiorganosiloxanes (P) comprise at least 3 and particularly at least 10 units of the general formula I.

Preferably, the liquid aminoalkyl-containing polyorganosiloxanes (P) comprise at least 95 mol %, more preferably at least 98 mol % and particularly at least 99.5 mol % of units selected from units of the general formulae I, II and III.

Further units of the polyorganosiloxanes (P) can be selected for example from units selected from units of the general formulae IX and X.

The ratio of a to b is chosen such that the polyorganosiloxanes (P) preferably have an amine number of at least 0.1, in particular at least 0.3 mequiv/g of polyorganosiloxane (P). The amine number of the poly-organosiloxanes (P) is preferably at most 7, more preferably at most 4.0 and most preferably at most 3.0 mequiv/g of polyorganosiloxane (P).

The amine number designates the number of ml of 1N HCl which are required for neutralizing 1 g of polyorganosiloxane (P).

The viscosity of the polyorganosiloxanes (P) is preferably at least 1 and more preferably at least 10 mPa·s and preferably at most 100,000 and most preferably at most 10,000 mPa·s at 25° C.

The ratio of the units of the general formulae I to the sum total of II and III is preferably at least 10, most preferably at least 50 and preferably at most 250, most preferably at most 150.

The ratio of units II to III is preferably at least 1.9 and most preferably at least 2.0 and preferably at most 70 and most preferably at most 50.

The polyorganosiloxanes (P) are obtainable via known chemical processes such as, for example, hydrolysis or equilibration.

The mixtures (M) preferably comprise preferably at least 5 and more preferably at least 10 parts by weight and preferably at most 100, more preferably at most 50 and most preferably at most 30 parts by weight of silicone resins (S).

The silicone resins (S) comprise preferably at least 95 mol % and particularly at least 98 mol % of units of the general formulae VII to X.

The silicone resins (S) are preferably MQ silicone resins (MQ) comprising at least 80 mol % of units formulae VII and X, preferably at least 95 mol % and particularly at least 97 mol %. The average ratio of units of the general formulae VII to X is preferably at least 0.25, more preferably at least 0.5 and preferably at most 4, more preferably at most most preferably at most 1.5.

The silicone resins (S) are also preferably DT silicone resins (DT) comprising at least 80 mol % of units, preferably at least 95 mol % and at least 97 mol % of units of the general formulae VIII and IX. The average ratio of units of the general formulae VIII to IX is preferably at least 0.01, more preferably at least 0.02 and preferably at most 3.5, more preferably at most 0.5.

Preferably, at most 8% by weight of the $R^{10}$ radicals are selected from —OR and OH.

The average molecular weight Mn of the silicone resins (S) is preferably at least 200 g/mol and more preferably at least 1000 g/mol and preferably at most 100,000 g/mol and more preferably at most 20,000 g/mol.

The mixtures (M) preferably comprise at most 2 parts by weight and more preferably at most 1 part by weight of water.

The mixtures (M) may comprise solvent (LM). Solvent (LM) is preferably selected from mono- or polyalcohols such as methanol, ethanol, n-propanol, isopropanol, butanol, n-amyl alcohol, i-amyl alcohol, diethylene glycol and glycerol; mono- or polyethers such as dioxane, tetrahydrofuran, diethyl ether, diisopropyl ether, propylene glycol, ethylene glycol monobutyl ether, ethylene glycol monohexyl ether, ethylene glycol monomethyl ether, ethylene glycol monoethyl ether, diethylene glycol dimethyl ether and diethylene glycol diethyl ether.

Preferably, mono- or polyalcohols and ethers thereof are used which have a boiling point or boiling range of at most 260° C. at 0.10 MPa.

When the mixtures (M) contain solvent (LM), their solvent (LM) content is preferably at least 2 parts by weight, more preferably at least 5 and preferably at most 100 parts by weight, more preferably at most 40 and most preferably at most 20 parts by weight.

The mixtures (M) in addition to aminoalkyl-containing polyorganosiloxanes (P), silicone resins (S), optionally the maximum amount of water and solvent, preferably do not contain any further constituents.

The mixtures (M) preferably have a viscosity at 25° C. of preferably 100 to 10,000 mPa·s.

The mixtures (M) are useful as hydrophobicizers for surfaces, preferably hard and soft porous surfaces such as, for example, wood, textiles, leather, hair, skin and stone.

All the above symbols in the above formulae each have their meanings independently of each other. The silicon atom is tetravalent in all the formulae.

In the examples which follow, unless otherwise stated, all quantitative and percentage recitations are by weight, all pressures are equal to 0.10 MPa (absolute) and all temperatures are equal to 20° C.

The water used in the examples is characterized as follows: The water is completely ion-free or salt-containing water, preferably completely ion-free water.

EXAMPLES

1. Preparation of a Stable Oil Mixture 13.2 g of MQ silicone resin ($\{[Me_3SiO_{1/2}]_{0.373}[SiO_2]_{0.627}\}_{40}$, Mn=2700 g/mol, resin contains 0.2% OH and 3.1% OEt [corresponds to $R^{10}$]) are dissolved in 10.5 g of ethylene glycol monohexyl ether (obtainable from Sigma-Aldrich Chemie GmbH) by stirring and subsequently admixed with 76.3 g of amine oil (viscosity about 1000 mm$^2$/s at 25° C. [corresponds to Ia+Ib+II+III=230], functional radicals —$(CH_2)_3NH(CH_2)NH_2$ [corresponds to $R^2$], amine number of 0.6 mmol/g, 90% SiMe$_3$ end groups, 10% SiMe$_2$OH end groups [corresponds to II/III=9,0]) at 25° C. to obtain a clear, colourless solution having a viscosity of about 3000 mPa·s. This mixture is stable for a period of 3 months.

2. Preparation of a Stable Oil Mixture 13.2 g of MQ silicone resin ($\{[Me_3SiO_{1/2}]_{0.373}[SiO_2]_{0.627}\}_{40}$, Mn=2700 g/mol, resin contains 0.2% OH and 3.1% OEt [corresponds to $R^{10}$]) are dissolved in 10.5 g of ethylene glycol monohexyl ether (obtainable from Sigma-Aldrich Chemie GmbH) by stirring and subsequently admixed with 76.3 g of amine oil (viscosity about 500 mm$^2$/s at 25° C. [corresponds to Ia+Ib+II+III=170], functional radicals —$(CH_2)_3NH(CH_2)NH_2$ [corresponds to $R^2$], amine number of 0.6 mmol/g, 68% SiMe$_3$ end groups, 25% SiMe$_2$OH end groups, 7% SiMe$_2$OMe end groups [corresponds to II/III=2,1]) at 25° C. to obtain a clear, colourless solution having a viscosity of about 3000 mPa·s. This mixture is stable for a period of 3 months.

3. Preparation of a Stable Oil Mixture 13.2 g of MQ silicone resin ($\{[Me_3SiO_{1/2}]_{0.373}[SiO_2]_{0.627}\}_{40}$, Mn=2700 g/mol, resin contains 0.2% OH and 3.1% OEt [corresponds to $R^{10}$]) are dissolved in 10.5 g of ethylene glycol monohexyl ether (obtainable from Sigma-Aldrich Chemie GmbH) by stirring and subsequently admixed with 76.3 g of amine oil (viscosity about 950 mm$^2$/s at 25° C. [corresponds to Ia+Ib+II+III=220], functional radicals —$(CH_2)_3NH(CH_2)NH_2$ [corresponds to $R_2$], amine number of 0.6 mmol/g, 92% SiMe$_3$ end groups, 7% SiMe$_2$OH end groups, 1% SiMe$_2$OMe end groups [corresponds to II/III=11,5]) at 25° C. to obtain a clear, colourless solution having a viscosity of about 3000 mPa·s. This mixture is stable for a period of 3 months.

4. Preparation of a Stable Oil Mixture 13.2 g of MQ silicone resin ($\{[Me_3SiO_{1/2}]_{0.373}[SiO_2]_{0.627}\}_{40}$, Mn=2700 g/mol, resin contains 0.2% OH and 3.1% OEt [corresponds to $R^{10}$]) are dissolved in 10.5 g of ethylene glycol monohexyl ether (obtainable from Sigma-Aldrich Chemie GmbH) by stirring and subsequently admixed with 76.3 g of amine oil (viscosity about 2500 mm$^2$/s at 25° C. [corresponds to Ia+Ib+II+III=315], functional radicals —$(CH_2)_3NH(CH_2)NH_2$ [corresponds to $R^2$], amine number of 0.8 mmol/g, 72% SiMe$_3$ end groups, 26% SiMe$_2$OH end groups, 2% SiMe$_2$OMe end groups [corresponds to II/III=2,6]) at 25° C. to obtain a clear, colourless solution having a viscosity of about 3000 mPa·s. This mixture is stable for a period of 3 months.

5. Preparation of a Stable Oil Mixture 3.5 g of MQ silicone resin ($\{[Me_3SiO_{1/2}]_{0.373}[SiO_2]_{0.627}\}_{40}$, Mn=2700 g/mol, resin contains 0.2% OH and 3.1% OEt [corresponds to $R^{10}$]) are mixed for 30 minutes with 20.2 g of amine oil (viscosity about 225 mm$^2$/s at 25° C. [corresponds to Ia+Ib+II+III=105], functional radicals —$(CH_2)_3NH(CH_2)NH_2$ [corresponds to $R^2$], amine number of 2.6 mmol/g, 94% SiMe$_3$ end groups, 5% SiMe$_2$OH end groups, 1% SiMe$_2$OMe end groups [corresponds to II/III=15.7]).

6. Preparation of a Stable Oil Mixture 5.9 g of DT silicone resin solution ($\{[Me_2SiO]_{0.03}[MeSiO_{3/2}]_{0.97}\}_{33}$, Mn=2300 g/mol, resin contains 0.4% OH and 4.4% OEt [corresponds to $R^{10}$], 25% in Shellsol T) are dissolved in 3.6 g ethylene glycol monohexyl ether (obtainable from Sigma-Aldrich Chemie GmbH) by stirring and subsequently admixed with 14.2 g of amine oil (viscosity about 1000 mm$^2$/s at 25° C. [corresponds to Ia+Ib+II+III=230], functional radicals —$(CH_2)_3NH(CH_2)NH_2$ [corresponds to $R^2$], amine number of 0.6 mmol/g, 90% SiMe$_3$ end groups, 10% SiMe$_2$OH end groups [corresponds to II/III=9.0]) at 25° C. to obtain a clear, colourless solution having a viscosity of about 3000 mPa·s. This mixture is stable for a period of 3 months.

7. Preparation of an Unstable Oil Mixture, not According to the Invention 13.2 g of MQ silicone resin ($\{[Me_3SiO_{1/2}]_{0.373}[SiO_2]_{0.627}\}_{40}$, Mn=2700 g/mol, resin contains 0.2% OH and 3.1% OEt [corresponds to $R^{10}$]) are dissolved in 10.5 g of ethylene glycol monohexyl ether (obtainable from Sigma-Aldrich Chemie GmbH) by stirring and subsequently admixed with 76.3 g of amine oil (viscosity about 750 mm$^2$/s at 25° C. [corresponds to Ia+Ib+II+III=325], functional radicals —$(CH_2)_3NH(CH_2)NH_2$ [corresponds to $R^2$], amine number of 0.7 mmol/g, 50% SiMe$_3$ end groups, 32% SiMe$_2$OH end groups, 18% SiMe$_2$OMe end groups [corresponds to II/III=1.0]) at 25° C. to obtain a clear, colourless solution having a viscosity of about 3000 mPa·s. After 3 d this mixture has formed a gel which has no utility for further use.

8. Preparation of an Unstable Oil Mixture, not According to the Invention 13.2 g of MQ silicone resin ($\{[Me_3SiO_{1/2}]_{0.373}[SiO_2]_{0.627}\}_{40}$, Mn=2700 g/mol, resin contains 0.2% OH and 3.1% OEt [corresponds to $R^{10}$]) are dissolved in 10.5 g of ethylene glycol monohexyl ether (obtainable from Sigma-Aldrich Chemie GmbH) by stirring and subsequently admixed with 76.3 g of amine oil (viscosity about 2800 mm²/s at 25° C. [corresponds to Ia+Ib+II+III=325], functional radicals —(CH$_2$)$_3$NH(CH$_2$)NH$_2$ [corresponds to R$^2$], amine number of 0.6 mmol/g, 47% SiMe$_3$ end groups, 45% SiMe$_2$OH end groups, 8% SiMe$_2$OMe end groups [corresponds to II/III=0.9]) at 25° C. to obtain a clear, colourless solution having a viscosity of about 3000 mPa·s. After 3 d this mixture has formed a gel which has no utility for further use.

9. Preparation of an Unstable Oil Mixture, not According to the Invention 13.2 g of MQ silicone resin ({[Me$_3$SiO$_{1/2}$]$_{0.373}$ [SiO$_2$]$_{0.627}$}$_{40}$, Mn=2700 g/mol, resin contains 0.2% OH and 3.1% OEt [corresponds to R$^{10}$]) are dissolved in 10.5 g of ethylene glycol monohexyl ether (obtainable from Sigma-Aldrich Chemie GmbH) by stirring and subsequently admixed with 76.3 g of amine oil (viscosity about 2900 mm²/s at 25° C. [corresponds to Ia+Ib+II+III=331], functional radicals —(CH$_2$)$_3$NH(CH$_2$)NH$_2$ [corresponds to R$^2$], amine number of 0.4 mmol/g, 47% SiMe$_3$ end groups, 47% SiMe$_2$OH end groups, 6% SiMe$_2$OMe end groups [corresponds to II/III=0.9]) at 25° C. to obtain a clear, colourless solution having a viscosity of about 3000 mPa·s. After 3 d this mixture has formed a gel which has no utility for further use.

10. Performance Examples

The mixtures prepared above were subjected to performance testing. This oil mixture was thinned to a solids content of 2% using universal spirits having a boiling range of 100/140° C.

1) Spruce wood cubes (3×3×3 cm) are placed for about 5 s into the about 10 mm deep impregnating solutions, blotted off and dried at RT for 24 hours. Then, the weight increase (g2-g1) after 1 hour of storage in 5 mm deep water is determined.

|  | Weight increase: |
| --- | --- |
| Untreated | >30% |
| Example 1 | 0.79% |
| Example 2 | 0.86% |
| Example 3 | 0.50% |
| Example 4 | 0.59% |
| Example 5 | 1.08% |
| Example 6 | 0.68% |

2) Cotton textiles are treated via dipping or by drenching with a pipette, dried at room temperature for at least six days and subsequently the penetration time of a drop of water or of water/isopropanol is determined. The mean value of three measurements is reported.

|  | Water | Water/iso = 90/10 | Water/iso = 80/20 |
| --- | --- | --- | --- |
| Untreated | <1 sec | <1 sec | <1 sec |
| Example 1 | >5 h | 200 min | 75 s |
| Example 2 | >5 h | 250 min | 25 s |
| Example 3 | >5 h | 200 min | 45 s |
| Example 4 | >5 h | 240 min | 20 s |
| Example 5 | >5 h | 180 min | 17 s |
| Example 6 | >5 h | 220 min | 23 s |

The invention claimed is:

1. Polyorganosiloxane-silicone resin mixtures (M) comprising:
   1) 100 parts by weight of one or more liquid aminoalkyl-containing polyorganosiloxanes (P) comprising at least 80 mol % of units selected from units of the formulae Ia, Ib, II and III $$R^1_2SiO_{2/2} \tag{Ia}$$

$$R^1_a R^2_b SiO_{(4-a-b)/2} \tag{Ib}$$

$$R^3_3 SiO_{(1/2)} \tag{II}$$

$$R^3_2 R^4 SiO_{(1/2)} \tag{III}$$

where
   a is 0 or 1,
   b is 1 or 2,
   a+b is 2,
   R$^1$ are monovalent hydrocarbyl radicals having 1-40 carbon atoms optionally substituted with halogens,
   R$^2$ are either
   a) aminoalkyl radicals of the formula IV $$-R^5-NR^6R^7 \tag{IV}$$

where
   R$^5$ are divalent hydrocarbyl radicals having 1-40 carbon atoms,
   R$^6$ are monovalent hydrocarbyl radicals having 1-40 carbon atoms, H, hydroxymethyl or alkanoyl radicals, and
   R$^7$ are radicals of the formula V $$-(R^8-NR^6)_x R^6 \tag{V}$$

where
   x is 0 or an integral value of 1 to 40, and
   R$^8$ are divalent radicals of the formula VI $$-(CR^9_2)_y \tag{VI}$$

where
   y is from 1 to 6, and
   R$^9$ are H or hydrocarbyl radicals having 1-40 carbon atoms, or
   b) in the formula IV R$^6$ and R$^7$ combine with the nitrogen atom to form a cyclic organic radical having 3 to 8 —CH$_2$— units, wherein nonadjacent —CH$_2$— units are optionally replaced by —C(=O)—, —NH—, —O— or —S—,
   R$^3$ are hydrocarbyl radicals having 1-40 carbon atoms optionally substituted with halogens,
   R$^4$ are —OR or —OH radicals, where R is an optionally halogen-substituted monovalent hydrocarbyl radical, and
   wherein, in the polyorganosiloxanes (P), the average ratio of the sum of units of the formulae Ia and Ib to the sum of units of the general formulae II and III is in the range from 0.5 to 500, the average ratio of units II to III being in the range from 1.86 to 100, and wherein the polyorganosiloxanes (P) have an average amine number of at least 0.01 mequiv/g,
   2) at least 1 part by weight of one or more silicone resins (S) which each comprise at least 80 mol % of units selected from units of the formulae VII, VIII, IX and X $$R^{10}_3 SiO_{1/2} \tag{VII}$$

$$R^{10}_2 SiO_{2/2} \tag{VIII}$$

$$R^{10}SiO_{3/2} \quad (IX),$$

$$SiO_{4/2} \quad (X),$$

where $R^{10}$ are hydrocarbyl radicals having 1-40 carbon atoms and optionally substituted with halogens, or are H, —OR or —OH radicals, at least 20 mol % of the units are units of the formulae IX and X and at most 10% by weight of the $R^{10}$ radicals are —OR and —OH radicals, and 3) at most 5 parts by weight of water.

2. The mixture of claim 1, wherein the silicone resins (S) are MQ silicone resins comprising at least 80 mol % of units of the formulae VII and X, and the average ratio of units of the formulae VII to X is in the range from 0.25 to 4.

3. The mixture of claim 2, wherein the liquid aminoalkyl-containing polyorganosiloxanes (P) comprise at least 95 mol % of units selected from units of the formulae Ia, Ib, II and III.

4. The mixture of claim 2, wherein the monovalent hydrocarbyl radicals R, $R^1$, $R^3$, $R^6$, $R^9$ and $R^{10}$ are alkyl radicals having 1 to 6 carbon atoms or phenyl radicals.

5. The mixture of claim 2, wherein the $R^2$ radicals are —$CH_2NR^6R^7$, —$(CH_2)_3NR^6R^7$ or —$(CH_2)_3N(R^6)(CH_2)_2N(R^6)_2$.

6. The mixtures of claim 2, comprising 5 to 50 parts by weight of MQ silicone resins.

7. The mixture of claim 1, wherein the liquid aminoalkyl-containing polyorganosiloxanes (P) comprise at least 95 mol % of units selected from units of the formulae Ia, Ib, II and III.

8. The mixture of claim 7, wherein the monovalent hydrocarbyl radicals R, $R^1$, $R^3$, $R^6$, $R^9$ and $R^{10}$ are alkyl radicals having 1 to 6 carbon atoms or phenyl radicals.

9. The mixture of claim 7, wherein the $R^2$ radicals are —$CH_2NR^6R^7$, —$(CH_2)_3NR^6R^7$ or —$(CH_2)_3N(R^6)(CH_2)_2N(R^6)_2$.

10. The mixture of claim 1, wherein the monovalent hydrocarbyl radicals R, $R^1$, $R^3$, $R^6$, $R^9$ and $R^{10}$ are alkyl radicals having 1 to 6 carbon atoms or phenyl radicals.

11. The mixture of claim 10, wherein the $R^2$ radicals are —$CH_2NR^6R^7$, —$(CH_2)_3NR^6R^7$ or —$(CH_2)_3N(R^6)(CH_2)_2N(R^6)_2$.

12. The mixture of claim 1, wherein the $R^2$ radicals are —$CH_2NR^6R^7$, —$(CH_2)_3NR^6R^7$ or —$(CH_2)_3N(R^6)(CH_2)_2N(R^6)_2$.

13. The mixture of claim 12, wherein the radicals $R^6$ and $R^7$ are H.

14. The mixture of claim 12, wherein 1 to 90 mol % of the $R^6$ and $R^7$ radicals are acetyl radicals and the remaining $R^6$ and $R^7$ radicals are H.

15. The mixture of claim 1, wherein the viscosity of the polyorganosiloxanes (P) is in the range of 10 mPa·s to 10,000 mPa·s at 25° C.

16. The mixture of claim 1, comprising at most 2 parts by weight of water.

17. The mixture of claim 1, further comprising at least one solvent (LM) which is selected from the group consisting of monoalcohols, polyalcohols, ethers of monoalcohols, ethers of polyalcohols and mixtures thereof.

18. The mixture of claim 1, which has a viscosity at 25° C. of 100 to 10,000 mPa·s.

19. The mixture of claim 1, wherein R is a $C_{1-6}$ alkyl radical.

* * * * *